United States Patent
Johnson

(10) Patent No.: US 12,180,993 B2
(45) Date of Patent: Dec. 31, 2024

(54) JOINT FOR CONNECTING AN ATTACHMENT TO A HYDRAULIC RAM

(71) Applicant: Jeffery L. Johnson, Wingate, NC (US)

(72) Inventor: Jeffery L. Johnson, Wingate, NC (US)

(73) Assignee: Jeffery L. Johnson, Wingate, NC (US)

( * ) Notice: Subject to any disclaimer, the term of this patent is extended or adjusted under 35 U.S.C. 154(b) by 0 days.

(21) Appl. No.: 18/150,222

(22) Filed: Jan. 5, 2023

(65) Prior Publication Data

US 2023/0213058 A1 Jul. 6, 2023

Related U.S. Application Data

(60) Provisional application No. 63/266,407, filed on Jan. 5, 2022.

(51) Int. Cl.
| | | |
|---|---|---|
| *F16C 11/06* | (2006.01) | |
| *A62B 3/00* | (2006.01) | |

(52) U.S. Cl.
CPC .............. *F16C 11/06* (2013.01); *A62B 3/005* (2013.01)

(58) Field of Classification Search
CPC ............................ F16C 2316/00; Y10S 72/705
See application file for complete search history.

(56) References Cited

U.S. PATENT DOCUMENTS

| | | | | |
|---|---|---|---|---|
| 3,375,892 A | * | 4/1968 | Kraschnewski | .......... E02F 9/04 180/8.5 |
| D216,825 S | * | 3/1970 | Hunnicutt et al. | ........... D15/138 |
| 3,710,655 A | * | 1/1973 | Brandle | .................. A62B 3/005 81/463 |
| 4,174,623 A | * | 11/1979 | LeGrand | .................. B21D 1/14 72/705 |
| 4,229,870 A | * | 10/1980 | Tate | ...................... B25B 27/026 29/254 |
| 4,273,311 A | | 6/1981 | Rio | |
| 4,457,212 A | * | 7/1984 | Unger | .................... E21D 23/08 91/169 |
| 4,941,343 A | * | 7/1990 | Stancato | .................. B21D 1/14 72/705 |
| 4,945,745 A | * | 8/1990 | Bathory | ................ B21B 35/143 72/249 |
| 5,301,598 A | * | 4/1994 | Sonnabend | ........... B21B 31/203 92/84 |
| 5,390,739 A | * | 2/1995 | Tailby | ................. E21B 23/0411 166/212 |
| 5,402,866 A | * | 4/1995 | Naedler | .................. B60T 17/16 92/24 |
| 5,673,898 A | * | 10/1997 | Michalo | ................. A62B 3/005 29/253 |

(Continued)

FOREIGN PATENT DOCUMENTS

| | | | |
|---|---|---|---|
| CN | 204704559 U | * | 10/2015 |
| DE | 3113536 A1 | * | 10/1982 |

(Continued)

*Primary Examiner* — Matthew R McMahon
(74) *Attorney, Agent, or Firm* — Sisson & Banyas, Attorneys at Law, LLC; Jeffrey J. Banyas

(57) ABSTRACT

A joint for connecting an attachment to a hydraulic ram comprises a ball and a socket. The socket connected to the base top surface of the attachment and encompassing at least a portion of the ball. The ball may be connected to a stem which may comprise a hole which serves as a connection point between the joint and an end of a hydraulic ram.

16 Claims, 7 Drawing Sheets

(56) References Cited

U.S. PATENT DOCUMENTS

| | | | |
|---|---|---|---|
| 5,732,932 A | 3/1998 | Michalo | |
| 6,746,183 B1 * | 6/2004 | Sullivan | E04G 25/068 |
| | | | 405/278 |
| 6,877,709 B2 * | 4/2005 | March | F16C 11/06 |
| | | | 248/549 |
| 7,921,531 B2 * | 4/2011 | Prine | B25D 9/06 |
| | | | 173/90 |
| 8,727,317 B2 * | 5/2014 | Lindner | B25F 5/005 |
| | | | 254/93 H |
| 9,278,836 B2 * | 3/2016 | Hisel | F15B 15/1433 |
| 9,527,258 B2 * | 12/2016 | Bordignon | F16F 9/54 |
| 9,856,892 B2 * | 1/2018 | Cooper | F15B 15/02 |
| 10,107,314 B2 * | 10/2018 | Cooper | F15B 15/1447 |
| 10,259,432 B1 * | 4/2019 | Meier | B60S 9/04 |
| 2010/0303626 A1 * | 12/2010 | Mostafi | F16H 1/2827 |
| | | | 416/170 R |
| 2016/0252192 A1 * | 9/2016 | Sheehan | F16K 31/602 |
| | | | 251/231 |
| 2023/0129231 A1 * | 4/2023 | Johnson | B25D 17/02 |
| | | | 254/133 R |

FOREIGN PATENT DOCUMENTS

| | | | | |
|---|---|---|---|---|
| DE | 4213490 C1 * | 9/1993 | | B21D 25/02 |
| DE | 202007016946 U1 * | 4/2008 | | A62B 3/005 |
| JP | H08197299 A * | 8/1996 | | B30B 15/06 |
| WO | 2021/216483 A1 | 10/2021 | | |

* cited by examiner

JOINT FOR CONNECTING AN ATTACHMENT TO A HYDRAULIC RAM

CROSS REFERENCES AND PRIORITIES

This Application claims the benefit of priority of U.S. Provisional Application No. 63/266,407 filed on 5 Jan. 2022, the teachings of which are incorporated herein by reference in their entirety.

BACKGROUND

Typically, spreaders such as those utilizing hydraulic rams have been used to aid in rescuing victims trapped within cars, trucks, aircraft, farm machinery, and the like following accidents. Fire departments, police departments, paramedics, and others engaged in emergency rescue work often use these tools to pry wreckage away from a trapped victim so that the victim can be safely and quickly removed from the wreckage.

Ends of the spreader apply opposing force between two surfaces of the wreckage—such as the vehicle floor and the vehicle dashboard which has collapsed. Typically, the hydraulic ram will have plates on either end for support or bracing on the solid surfaces. In conventional spreaders, these plates are flat.

One example of a hydraulic ram plate is disclosed in U.S. Pat. No. 4,273,311 which teaches a flat, pivotable plate attached to each of two hydraulic force arms for spreading wreckage. The spreader plates also include a serrated gripping surface.

Other spreaders utilize U-shaped plates which substantially complement the shape of a steering column of a vehicle. However, due to the smooth surfaces of the plate metal on the metal column, a suitable grip is not attained and the tool tends to slip. Further, there is no angle to the tools so that the flat side of the tool is required to apply pressure to an angled steering column.

Others have proposed modification to hydraulic ram plates designed to not only complement the shape of areas of the vehicle, but also to provide improved grip during operation. One such solution is proposed in U.S. Pat. No. 5,732,932 which teaches to include both lateral and transverse cuts to allow better grabbing ability.

Additional hydraulic ram plates are disclosed in International Patent Publication No. WO 2021/216483, the teachings of which are incorporated by reference herein in their entirety. WO 2021/216483 discloses an attachment for a hydraulic ram comprising a base, a hydraulic ram attachment mechanism, and at least a first plurality of teeth and a second plurality of teeth. The hydraulic ram attachment mechanism is connected to the base top surface. The first plurality of teeth extend from the base bottom surface along at least a portion of the base first edge. The second plurality of teeth extend from the base bottom surface along at least a portion of the base second edge.

Existing hydraulic ram plates remain limited in their use as the hydraulic ram plate is traditionally attached to the hydraulic ram in a fixed position substantially perpendicular to the longitudinal axis of the hydraulic ram. This limits the ability of the hydraulic ram with installed hydraulic ram plates to operate in confined spaces at varying angles. The need exists, therefore, for an improved device for connecting an attachment—such as a hydraulic ram plate—to a hydraulic ram.

SUMMARY

Disclosed herein is a joint for connecting an attachment to a hydraulic ram. The attachment comprises a base, the joint, and at least a first plurality of teeth and a second plurality of teeth. The base has a base first edge, a base second edge opposite the base first edge, a base first end, and a base second end defining a base horizontal plane. The base horizontal plane has a base top surface and a base bottom surface with a base wall spanning a distance between the base top surface and the base bottom surface. The joint comprises a ball and a socket. The socket is connected to the base top surface and encompasses at least a portion of the ball. The first plurality of teeth extend from the base bottom surface along at least a portion of the base first edge. The second plurality of teeth extend from the base bottom surface along at least a portion of the base second edge.

In some embodiments, the socket may comprise a first socket component and a second socket component. The first socket component may be integrally connected to the base top surface. The second socket component may then be removably connected to the first socket component by one or more fasteners.

In certain embodiments, the ball may comprise a stem extending from a ball surface substantially opposite the portion of the ball which is encompassed by the socket. The stem may comprise a hole passing into the stem substantially parallel with a stem central axis.

In some embodiments, the first plurality of teeth may be integrally connected to a first tooth plate. The first tooth plate may be connected to the base along the base first edge by at least a first fastener.

In certain embodiments, the second plurality of teeth may be integrally connected to a second tooth plate. The second tooth plate may be connected to the base along the base second edge by at least a second fastener.

In some embodiments, the attachment may further comprise at least a third plurality of teeth and a fourth plurality of teeth. The third plurality of teeth may extend from the base bottom surface along at least a portion of the base first end. The fourth plurality of teeth may extend from the base bottom surface along at least a portion of the base second end.

In certain embodiments, the third plurality of teeth may be integrally connected to a third tooth plate. The third tooth plate may be connected to the base along the base first end by at least a third fastener.

In some embodiments, the fourth plurality of teeth may be integrally connected to a fourth tooth plate. The fourth tooth plate may be connected to the base along the base second end by at least a fourth fastener.

In certain embodiments, the attachment may further comprise at least one spike connected to and extending from the base bottom surface. The at least one spike may comprise a plurality of spikes. The plurality of spikes may be arranged in an "X" pattern along the base bottom surface.

In some embodiments, the base may be made of a first material comprising aluminum. In certain embodiments, the first plurality of teeth and the second plurality of teeth may each independently be made of a material comprising steel. In some embodiments, the third plurality of teeth and the fourth plurality of teeth may each independently be made of a material comprising steel.

Further disclosed herein is a hydraulic ram comprising at least a first attachment and a second attachment wherein the first attachment and the second attachment are each independently connected to the hydraulic ram by a joint of the type disclosed herein. The first attachment may be connected to a hydraulic ram first end. The second attachment may be connected to a hydraulic ram second end opposite the hydraulic ram first end.

DETAILED DESCRIPTION

Disclosed herein is a joint for connecting an attachment to a hydraulic ram. As described herein and in the claims, the following numbers refer to the following structures as noted in the Figures.

- 10 refers to a hydraulic ram.
- 11 refers to a hydraulic ram first end.
- 11 refers to a hydraulic ram first end.
- 12 refers to a hydraulic ram second end.
- 12 refers to a hydraulic ram second end.
- 100 refers to an attachment.
- 110 refers to a base.
- 111 refers to a base first edge.
- 116 refers to a base top surface
- 117 refers to a base bottom surface.
- 130 refers to a first plurality of teeth.
- 131 refers to a first tooth plate.
- 140 refers to a second plurality of teeth.
- 141 refers to a second tooth plate.
- 150 refers to a third plurality of teeth.
- 151 refers to a third tooth plate.
- 160 refers to a fourth plurality of teeth.
- 161 refers to a fourth tooth plate.
- 300 refers to a spike.
- 500 refers to a joint.
- 510 refers to a ball.
- 520 refers to a socket.
- 521 refers to a first socket component.
- 522 refers to a second socket component.
- 530 refers to a joint central axis.
- 540 refers to a stem.
- 600 refers to a fastener.
- 541 refers to a hole.
- 542 refers to a stem central axis.
- 600 refers to a fastener.

Figure 1:
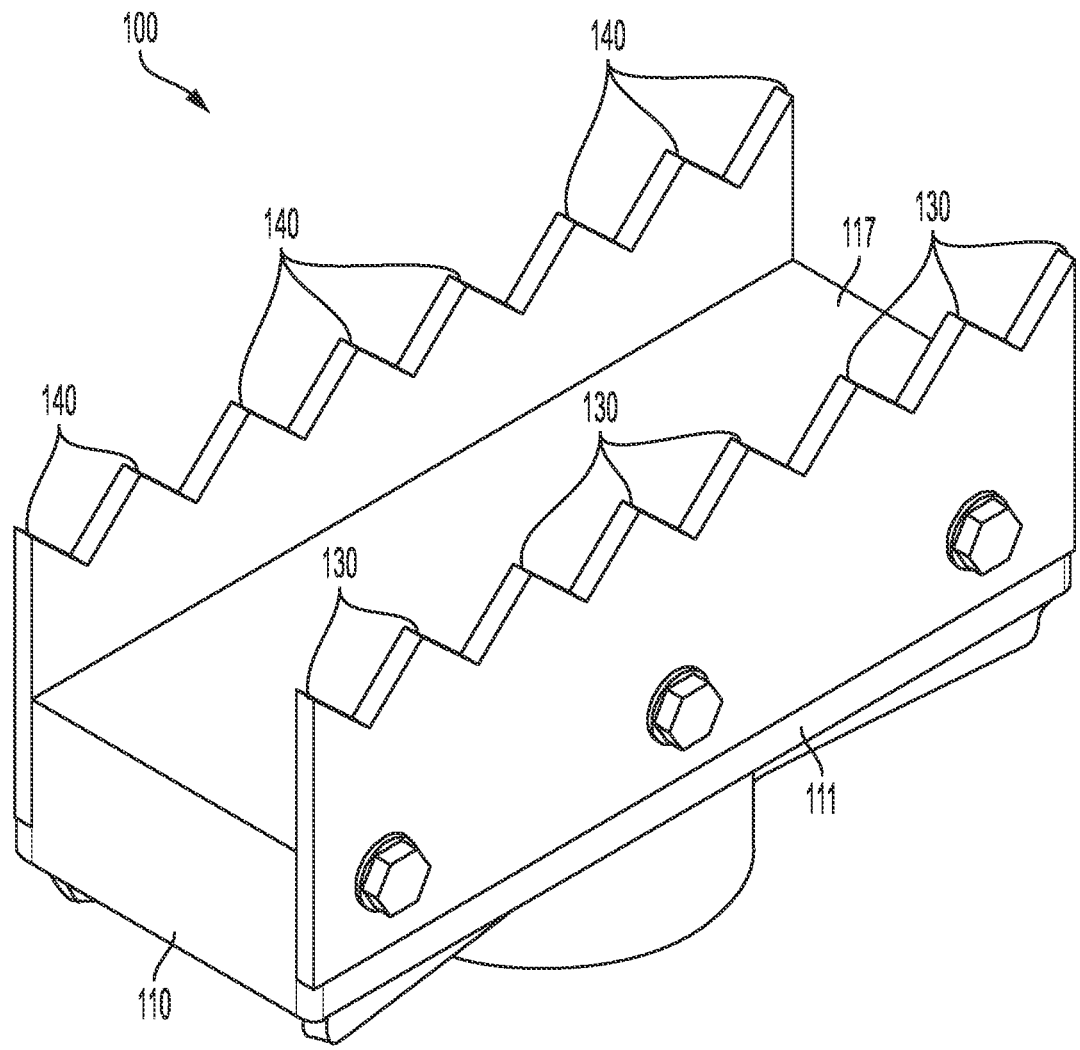
FIG. 1 depicts one embodiment of a prior art attachment for a hydraulic ram.
Figure 2:
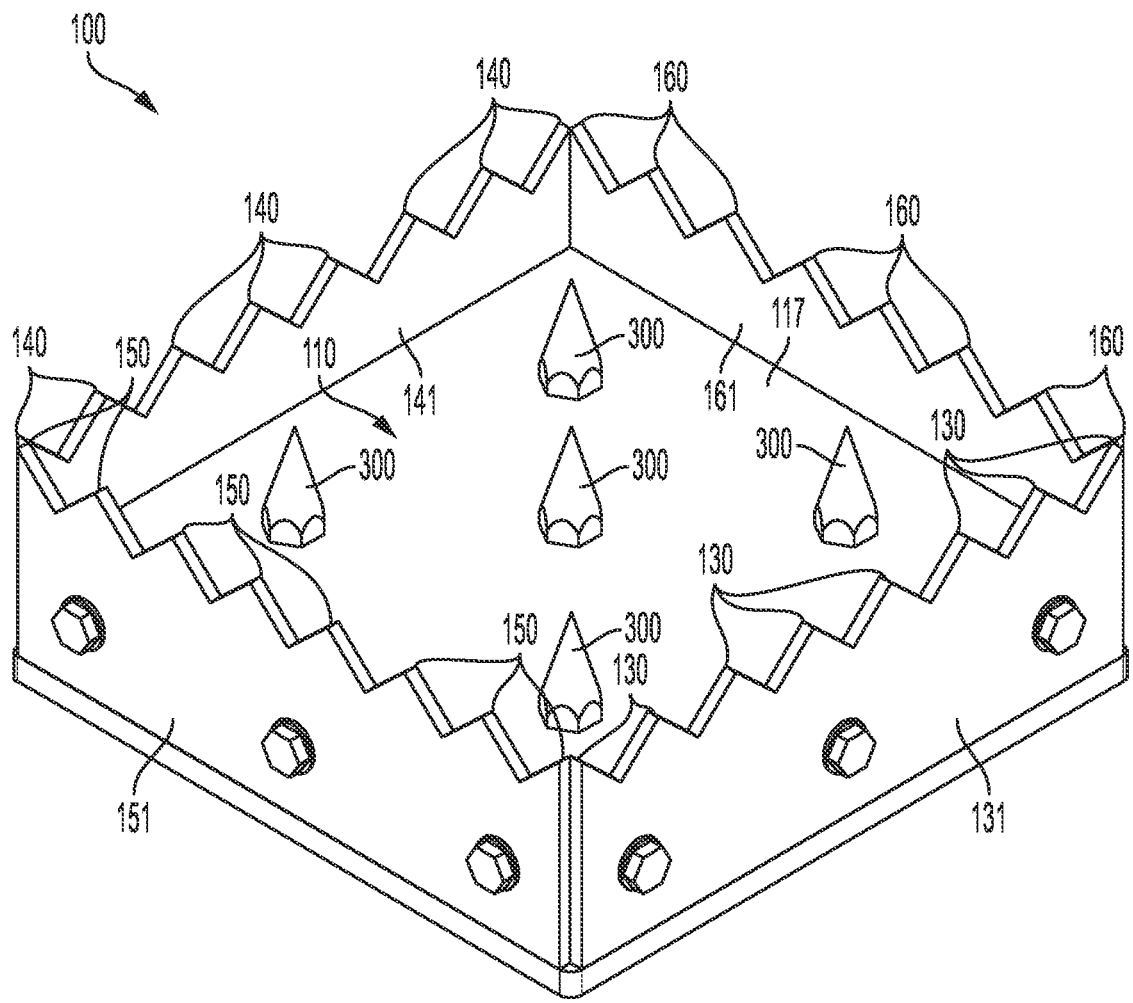
FIG. 2 depicts another embodiment of a prior art attachment for a hydraulic ram.
Figure 3:
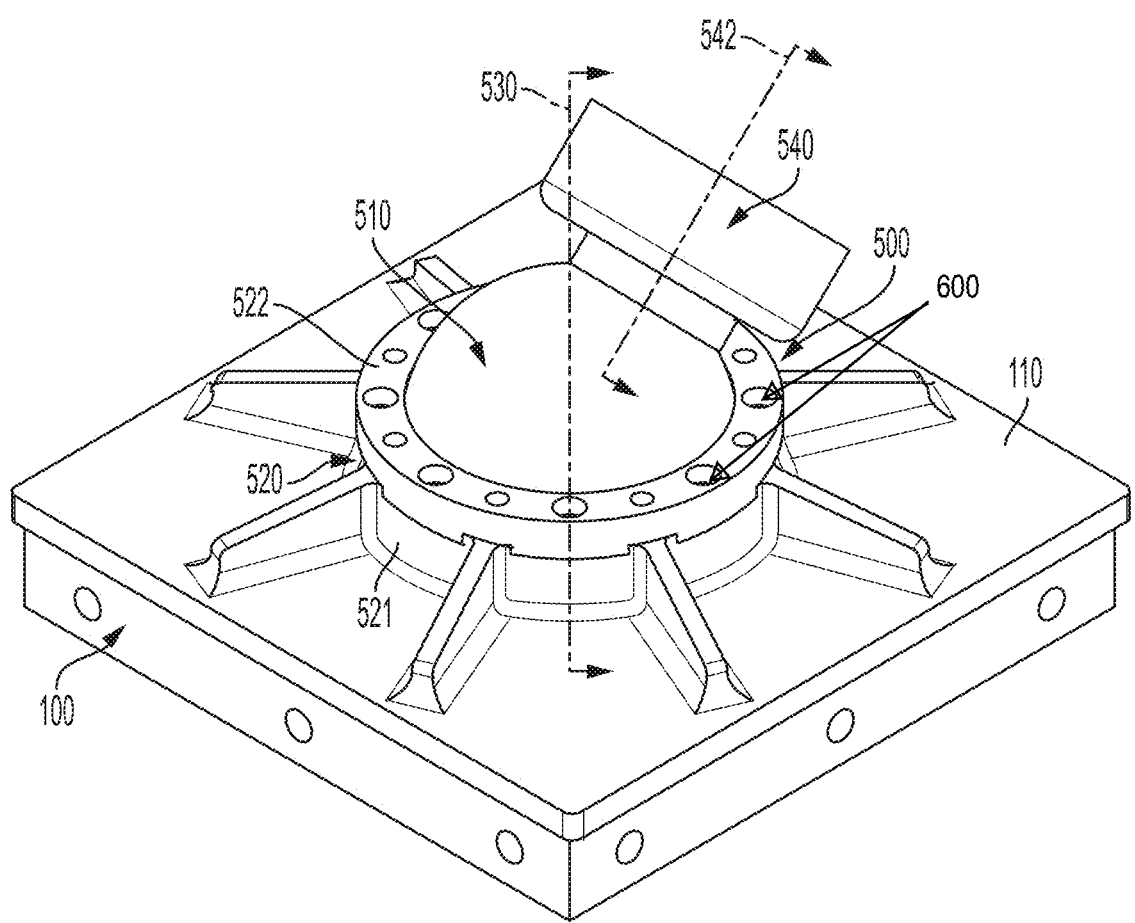
FIG. 3 depicts a perspective view of one embodiment of a joint for connecting an attachment to a hydraulic ram.

FIG. 1 and FIG. 2 show embodiments of a prior art attachment (100) for a hydraulic ram (10) disclosed in International Patent Publication No. WO 2021/216483, the teachings of which are incorporated by reference herein in their entirety. The joint (500 as shown in FIG. 3 through FIG. 6) for connecting the attachment to the hydraulic ram may be utilized with—among other hydraulic ram plates and attachments—any of the attachments disclosed in WO 2021/216483.

Specifically, FIG. 1 shows a first plurality of teeth (130) extending from a base bottom surface (117) along a base first edge (111) and a second plurality of teeth (140) extending from a base bottom surface along a base second edge. As the base first edge is opposite the base second edge, a channel may be formed between the first plurality of teeth and the second plurality of teeth.

In the embodiment shown in FIG. 2, the attachment (100) further comprises a third plurality of teeth (150) and a fourth plurality of teeth (160). As shown in FIG. 2, the first plurality of teeth extend from the base bottom surface (117) along at least a portion of a base first end. Similarly, the fourth plurality of teeth extend from the base bottom surface along at least a portion of a base second end. Preferably, one or more of the first plurality of teeth, the second plurality of teeth, the third plurality of teeth and/or the fourth plurality of teeth will extend from the base bottom surface substantially perpendicular or perpendicular with a base horizontal plane.

FIG. 2 also shows an embodiment of an attachment which comprises at least one spike (300) connected to and extending from the base bottom surface (117). When present, the at least one spike may comprise a plurality of spikes. The positioning of the spikes along the base bottom surface is not considered important. However, in some embodiments, the plurality of spikes may be arranged in an "X" pattern along the base bottom surface as shown in FIG. 2. In some embodiments, the first plurality of teeth will be connected to a first tooth plate with the first tooth plate connected to the base first edge. When used, the first plurality of teeth are preferably integrally connected to the first tooth plate such as by manufacturing the first plurality of teeth and the first tooth plate of a single integral piece of material. The first tooth plate may be connected to the base first edge by at least one fastener such as a bolt, a screw, a clip, a rivet, or the like.

In some embodiments, the second plurality of teeth will be connected to a second tooth plate with the second tooth plate connected to the base second edge. When used, the second plurality of teeth are preferably integrally connected to the second tooth plate such as by manufacturing the second plurality of teeth and the second tooth plate of a single integral piece of material. The second tooth plate may be connected to the base second edge by at least one fastener such as a bolt, a screw, a clip, a rivet, or the like.

In some embodiments, the third plurality of teeth will be connected to a third tooth plate with the third tooth plate connected to the base first end. When used, the third plurality of teeth are preferably integrally connected to the third tooth plate such as by manufacturing the third plurality of teeth and the third tooth plate of a single integral piece of material. The third tooth plate may be connected to the base first end by at least one fastener such as a bolt, a screw, a clip, a rivet, or the like.

In some embodiments, the fourth plurality of teeth will be connected to a fourth tooth plate with the fourth tooth plate connected to the base second end. When used, the fourth plurality of teeth are preferably integrally connected to the fourth tooth plate such as by manufacturing the fourth plurality of teeth and the fourth tooth plate of a single integral piece of material. The fourth tooth plate may be connected to the base second end by at least one fastener such as a bolt, a screw, a clip, a rivet, or the like.

FIG. 3 through FIG. 6 shows an embodiment of a joint (500) for connecting an attachment (100) to a hydraulic ram (10). As shown in FIG. 3 through FIG. 6, the joint comprises a ball (510) and a socket (520). The socket may be connected to the base top surface (116) and in some embodiments will be formed of a first socket component (521) and a second socket component (522). The first socket component may be integrally connected to the base top surface while the second socket component may be removably connected to the first socket component by one or more fasteners—such as bolts, screws, rivets, clamps, or the like.

Once assembled, the socket (520) encompasses at least a portion of the ball (510) in a manner such that the ball may pivot about a joint central axis (530). In this manner, the joint may be considered a ball and socket joint—sometimes referred to as an enarthrodial joint.

Figure 4:
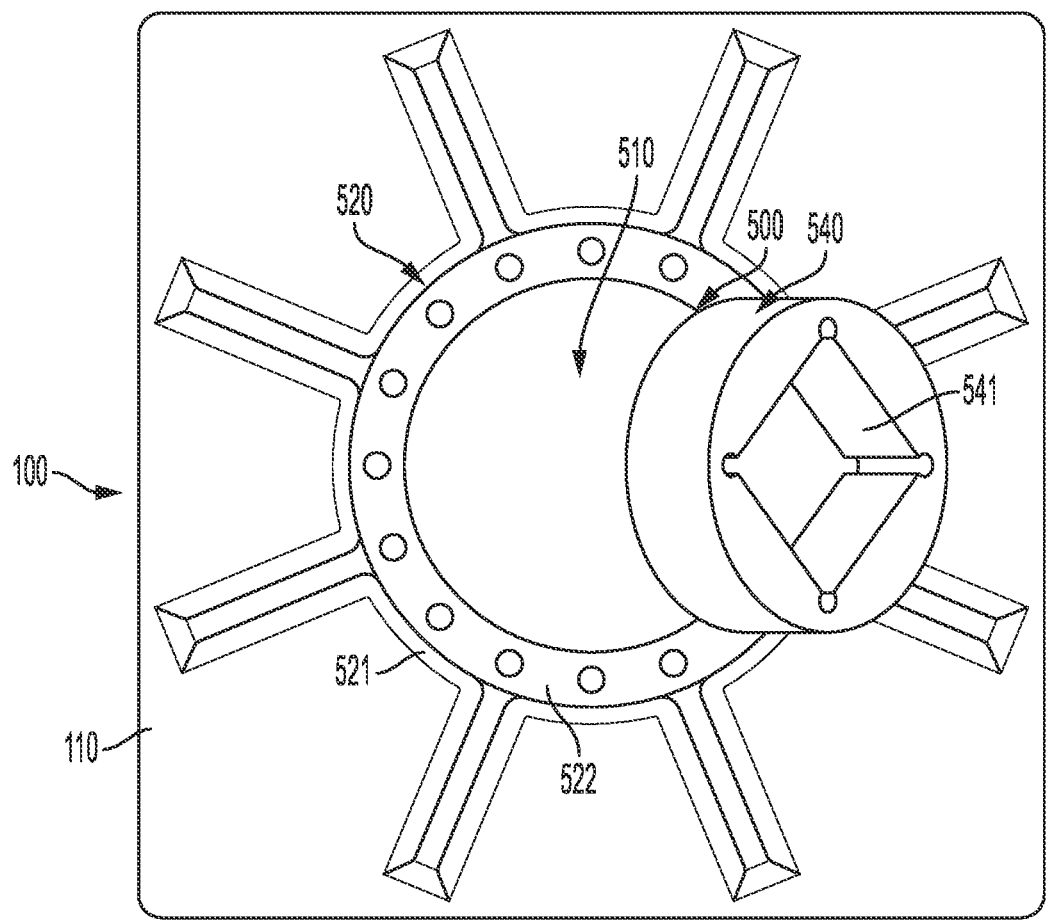
FIG. 4 depicts a top view of the embodiment of a joint for connecting an attachment to a hydraulic ram of FIG. 3.
Figure 5:
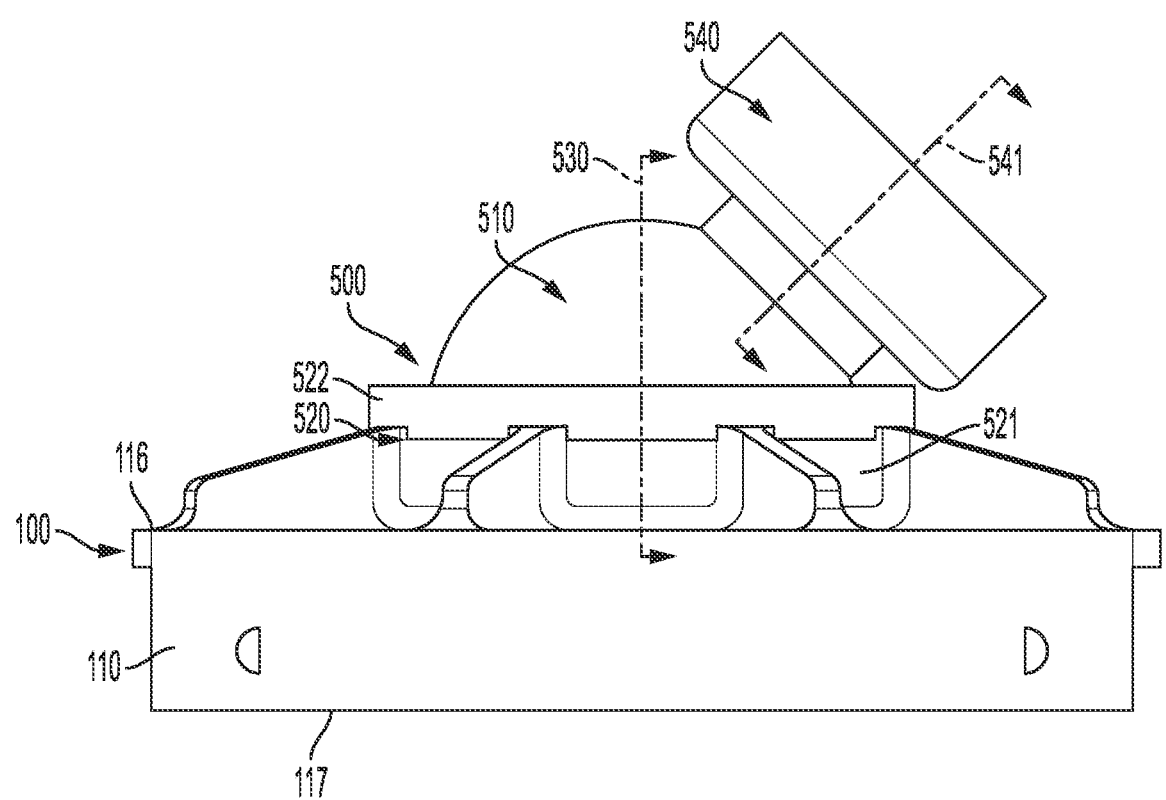
FIG. 5 depicts a side view of the embodiment of a joint for connecting an attachment to a hydraulic ram of FIG. 3.
Figure 6:
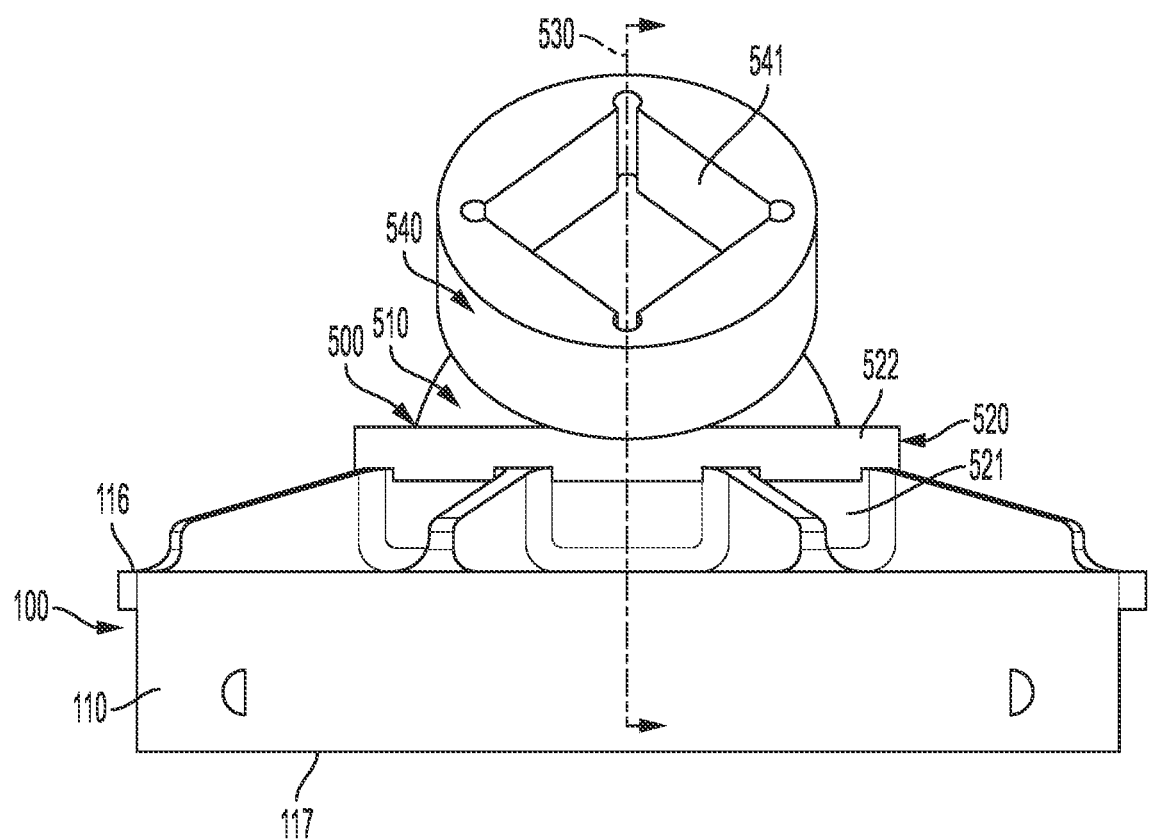
FIG. 6 depicts a front view of the embodiment of a joint for connecting an attachment to a hydraulic ram of FIG. 3.
Figure 7:
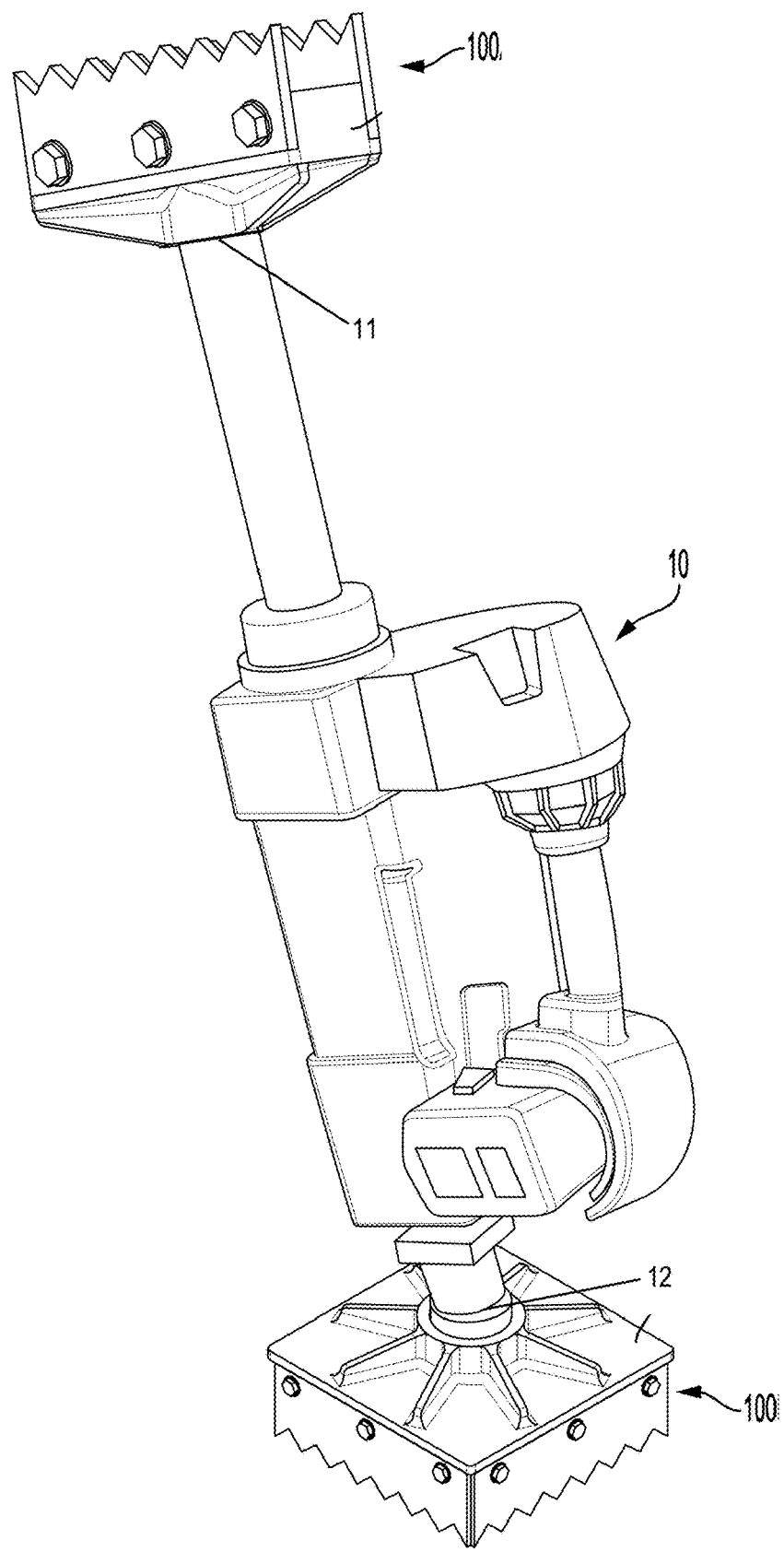
FIG. 7 depicts an assembly of a joint connecting to a hydraulic ram of FIG. 3.

The ball (510) may be connected to a stem (540) which extends from a ball surface substantially opposite the portion of the ball which is encompassed by the socket. As shown in FIG. 4, the stem may comprise a hole (541) passing into—but not through—the stem substantially parallel with the stem central axis (542). This hole may serve as a connection point between the joint and an end of the hydraulic ram (10) similar to the hydraulic ram attachment mechanism described in WO 2021/216483.

The various components may be manufactured of any rigid material with rigid metals such as aluminum, aluminum alloys, steel, stainless steel, cast iron, titanium, copper, and brass being preferred materials. In preferred embodiments, the base will be manufactured of aluminum or an aluminum alloy. The teeth in preferred embodiments will be manufactured of steel or stainless steel.

The joint disclosed herein is an improvement on existing devices for connecting an attachment—such as a hydraulic ram plate—to a hydraulic ram. The ball and socket joint allows the attachment to pivot about the hydraulic ram central axis such that the attachment may be secured against various surfaces in confined spaces and at varying angles.

What is claimed is:

1. A joint (500) for connecting an attachment (100) to a hydraulic ram (10), said attachment comprising:
    a base (110) having a base first edge, a base second edge opposite the base first edge, a base first end, and a base second end defining a base horizontal plane having a base top surface (116) and a base bottom surface (117) with a base wall spanning a distance between the base top surface and the base bottom surface;
    the joint comprising a ball (510) and a socket (520); and at least a first plurality of teeth (130) and a second plurality of teeth (140); and
    wherein the socket is connected to the base top surface;
    wherein the socket encompasses at least a portion of the ball;
    wherein the ball comprises a stem (540) extending from a ball surface substantially opposite the portion of the ball which is encompassed by the socket;
    wherein the stem comprises a hole (541) passing into the stem substantially parallel with a stem central axis (542), said hole consisting of a plurality of smooth surfaces, and said stem being configured to removably connect the joint to an end of the hydraulic ram by passing the end of the hydraulic ram into the hole;
    wherein the first plurality of teeth extend from the base bottom surface along at least a portion of the base first edge; and
    wherein the second plurality of teeth extend from the base bottom surface along at least a portion of the base second edge.

2. The joint for connecting an attachment to a hydraulic ram of claim 1, said socket comprising a first socket component (521) integrally connected to the base top surface, and a second socket component (522) removably connected to the first socket component by one or more fasteners.

3. The joint for connecting an attachment to a hydraulic ram of claim 1, wherein the first plurality of teeth are integrally connected to a first tooth plate, the second plurality of teeth are integrally connected to a second tooth plate, the first tooth plate is connected to the base along the base first edge by at least a first fastener, and the second tooth plate is connected to the base along the base second edge by at least a second fastener.

4. The joint for connecting an attachment to a hydraulic ram of claim 3, wherein the first plurality of teeth and the second plurality of teeth are each independently made of a material comprising steel.

5. The joint for connecting an attachment to a hydraulic ram of claim 4, wherein the base is made of a first material comprising aluminum.

6. The joint for connecting an attachment to a hydraulic ram of claim 1, further comprising at least a third plurality of teeth (150) and a fourth plurality of teeth (160), wherein the third plurality of teeth extend from the base bottom surface along at least a portion of the base first end, and the fourth plurality of teeth extend from the base bottom surface along at least a portion of the base second end.

7. The joint for connecting an attachment to a hydraulic ram of claim 6, wherein the third plurality of teeth are integrally connected to a third tooth plate, the fourth plurality of teeth are integrally connected to a fourth tooth plate, the third tooth plate is connected to the base along the base first end by at least a third fastener, and the fourth tooth plate is connected to the base along the base second end by at least a fourth fastener.

8. The joint for connecting an attachment to a hydraulic ram of claim 7, wherein the third plurality of teeth and the fourth plurality of teeth are each independently made of a material comprising steel.

9. The joint for connecting an attachment to a hydraulic ram of claim 8, wherein the base is made of a first material comprising aluminum.

10. The joint for connecting an attachment to a hydraulic ram of claim 6, wherein the third plurality of teeth and the fourth plurality of teeth are each independently made of a material comprising steel.

11. The joint for connecting an attachment to a hydraulic ram of claim 1, further comprising at least one spike (300) connected to and extending from the base bottom surface.

12. The joint for connecting an attachment to a hydraulic ram of claim 11, wherein the at least one spike comprises a plurality of spikes.

13. The joint for connecting an attachment to a hydraulic ram of claim 12, wherein the plurality of spikes are arranged in an "X" pattern along the base bottom surface.

14. The joint for connecting an attachment to a hydraulic ram of claim 1, wherein the base is made of a first material comprising aluminum.

15. The joint for connecting an attachment to a hydraulic ram of claim 1, wherein the first plurality of teeth and the second plurality of teeth are each independently made of a material comprising steel.

16. A hydraulic ram comprising at least a first attachment and a second attachment wherein the first attachment and the second attachment are each independently connected to the hydraulic ram by a joint of the type called for in claim 1, the first attachment is connected to a hydraulic ram first end, and the second attachment is connected to a hydraulic ram second end opposite the hydraulic ram first end.

* * * * *